United States Patent [19]
Rausch et al.

[11] Patent Number: 5,509,712
[45] Date of Patent: Apr. 23, 1996

[54] CONVERTIBLE VEHICLE TOPWELL ASSEMBLY

[75] Inventors: Jeffrey S. Rausch, Royal Oak; Wayne A. Conti, Troy; Jack C. Higdon, Canton, all of Mich.

[73] Assignee: Chrysler Corporation, Auburn Hills, Mich.

[21] Appl. No.: 319,214

[22] Filed: Oct. 5, 1994

Related U.S. Application Data

[63] Continuation of Ser. No. 56,151, Apr. 30, 1993, abandoned.

[51] Int. Cl.$^6$ .................. B60J 7/00; B60R 13/07
[52] U.S. Cl. .......... 296/124; 296/37.16; 296/38; 296/39.1; 296/208; 296/186
[58] Field of Search ...... 296/37.16, 39.1–39.3, 296/107, 124, 136, 195, 208, 213, 186, 37.1, 37.2, 97.23, 38, 194; 220/573

[56] References Cited

U.S. PATENT DOCUMENTS

| | | | |
|---|---|---|---|
| 2,650,855 | 9/1953 | Peirce | 296/97.23 |
| 2,750,227 | 6/1956 | Orr. | |
| 3,096,117 | 7/1963 | Hallenbeck | 296/107 |
| 3,143,373 | 8/1964 | Fordyce | 296/107 |
| 4,176,877 | 12/1979 | Schulz et al. | 296/208 |
| 4,516,803 | 5/1985 | Kaltz et al. | 296/107 |
| 4,669,774 | 6/1987 | Crain | 296/136 |
| 4,679,844 | 7/1987 | Wolford et al. | 296/136 |
| 4,750,776 | 6/1988 | Barben | 296/39.2 |
| 4,838,604 | 6/1989 | Kochi | 296/180.5 |
| 4,988,121 | 1/1991 | Yoshii | 296/186 X |
| 4,998,766 | 3/1991 | Biermacher et al. | 296/136 |
| 5,005,898 | 4/1991 | Benedetto et al. | 296/194 |
| 5,020,846 | 6/1991 | Bonnett | 296/186 |
| 5,036,570 | 8/1991 | Glickenberger | 296/195 |
| 5,044,848 | 9/1991 | Burnham | 296/39.2 X |
| 5,056,857 | 10/1991 | Ney et al. | 296/107 |
| 5,076,632 | 12/1991 | Surratt | 296/96.21 |
| 5,184,869 | 2/1993 | Bauer | 296/213 |

FOREIGN PATENT DOCUMENTS

| | | | |
|---|---|---|---|
| 669054 | 3/1952 | United Kingdom | 296/208 |
| 820058 | 9/1959 | United Kingdom | 296/97.23 |
| 2257666 | 1/1993 | United Kingdom | 296/39.2 |

*Primary Examiner*—Dennis H. Pedder
*Attorney, Agent, or Firm*—Mark P. Calcaterra

[57] ABSTRACT

A topwell assembly for use with a convertible top on an automotive vehicle to store the top in a down position. The topwell assembly is made of molded, rigid unitary shell conforming to an environment of continuous and non-continuous surfaces. The shell has a support surface and a side wall surface projecting from the support surface for supporting the convertible top when the top is in a down, storage position.

1 Claim, 2 Drawing Sheets

CONVERTIBLE VEHICLE TOPWELL ASSEMBLY

This is a continuation of U.S. patent application Ser. No. 08/056,151, filed on Apr. 30, 1993, now abandoned.

BACKGROUND OF THE INVENTION

1. Field of the Invention

The present invention relates generally to convertible tops for automotive vehicles and, more particularly, to a topwell assembly for use in storing an automotive vehicle convertible top when the top is in a down or storage position.

2. Description of the Relevant Art

Convertible tops, i.e. tops that fold back, have been used in the automotive vehicle industry for years. The attraction of convertible tops is that they may be raised to cover a passenger compartment of the vehicle during cool or rainy weather and folded down to expose the passenger compartment to an open air atmosphere during periods of warm or sunny weather. When folded back, the convertible top is stored in an area behind a back seat of the vehicle and in front of a trunk of the vehicle. This area is typically referred to as the topwell or slingwell area. Regardless of the position of the convertible top, i.e. up or down, the topwell area is subject to water accumulation because it is impossible to completely seal a rear window to a fabric convertible top. Additionally, any place a stitch is placed through the convertible top is a potential leak area. Therefore, there is a need in the art to drain accumulated water from the topwell area.

Previously, topwells for the topwell area have been composed of several vinyl parts typically assembled through a cut and sew fashion including snaps, grommets, and plastic extrusions. A vinyl topwell has several disadvantages including leakage along seams, reduced wear capabilities, no support (i.e. nothing can be placed in the topwell) and reduced or low noise dampening capabilities. Previous attempts at silencing vehicle noise were limited to additional parts covering wheel houses, top motor and floor pans. Thus, there is a need in the art to provide a topwell which resists leakage and dampens noise.

SUMMARY OF THE INVENTION

It is, therefore, one object of the present invention to provide a topwell assembly for a convertible top on an automotive vehicle.

It is another object of the present invention to provide a self supporting, water proof and durable topwell assembly.

It is yet another object of the present invention to provide a convertible vehicle topwell assembly which provides sound insulation to dampen and absorb vehicle noise.

It is still another object of the present invention to provide a convertible vehicle topwell assembly which maximizes use of storage space and minimizes the number of gaps and voids in adjacent parts.

To achieve the foregoing objects, the present invention is a topwell assembly for a convertible top on an automotive vehicle. The topwell assembly includes a unitary shell having a support surface and a side wall surface projecting from the support surface for supporting the convertible top when the top is in a down, storage position.

One advantage of the present invention is that the convertible vehicle topwell assembly includes a combination of molded plastic parts which are self supporting, and waterproof. Another advantage of the present invention is that the topwell assembly includes silencing material which may be attached to the outer surface of the parts to provide sound insulation and dampen noise. Yet another advantage of the present invention is that the topwell assembly allows for maximum use of storage space while minimizing the number of gaps and voids in the vehicle interior which provides a continuously sealed noise barrier having a reduced overall weight. Still another advantage of the present invention is that the topwell assembly catches and drains any water from the convertible top to the outside of the vehicle.

DESCRIPTION OF THE PREFERRED EMBODIMENT(S)

Figure 1:
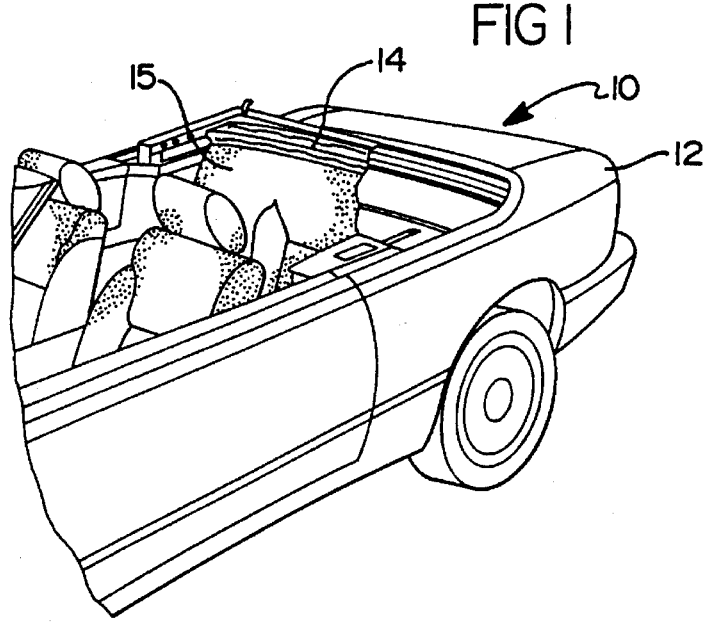
FIG. 1 is a perspective view of a topwell assembly, according to the present invention, illustrated in operational relationship on an automotive vehicle.

Referring to the drawings and in particular to FIG. 1 thereof, a topwell assembly 10, according to the present invention, is illustrated in operational relationship on an automotive vehicle 12. As illustrated in FIG. 1, the vehicle 12 includes a convertible top 14, placed in a top down or storage position in the topwell assembly 10. The vehicle 12 also includes a back or rear seat 15 in front of the topwell assembly 10. It should be appreciated that the topwell assembly 10 performs a three fold function, collecting and draining any accumulated water away from the vehicle 12, providing a storage area when the top 14 is up and providing a silencing mechanism to reduce vehicle noise.

Figure 2:
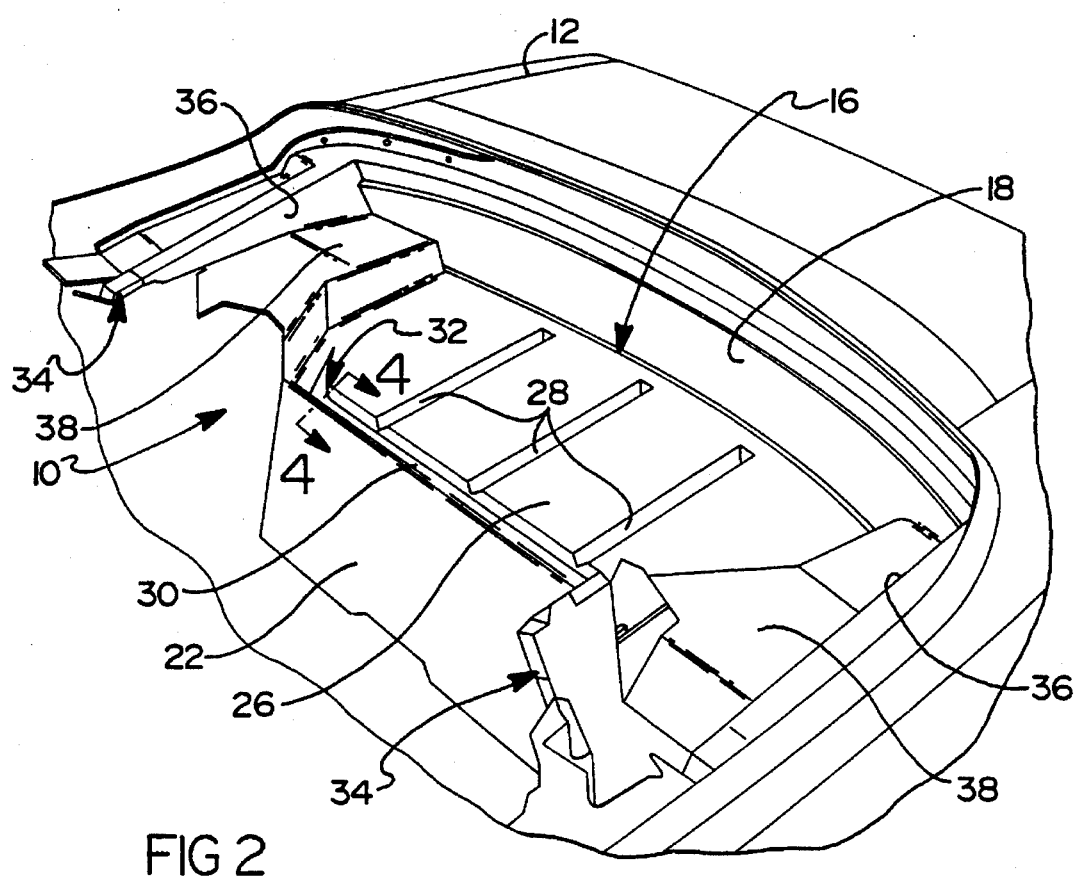
FIG. 2 is an enlarged perspective view of the topwell assembly of FIG.1 with the convertible top removed.
Figure 3:
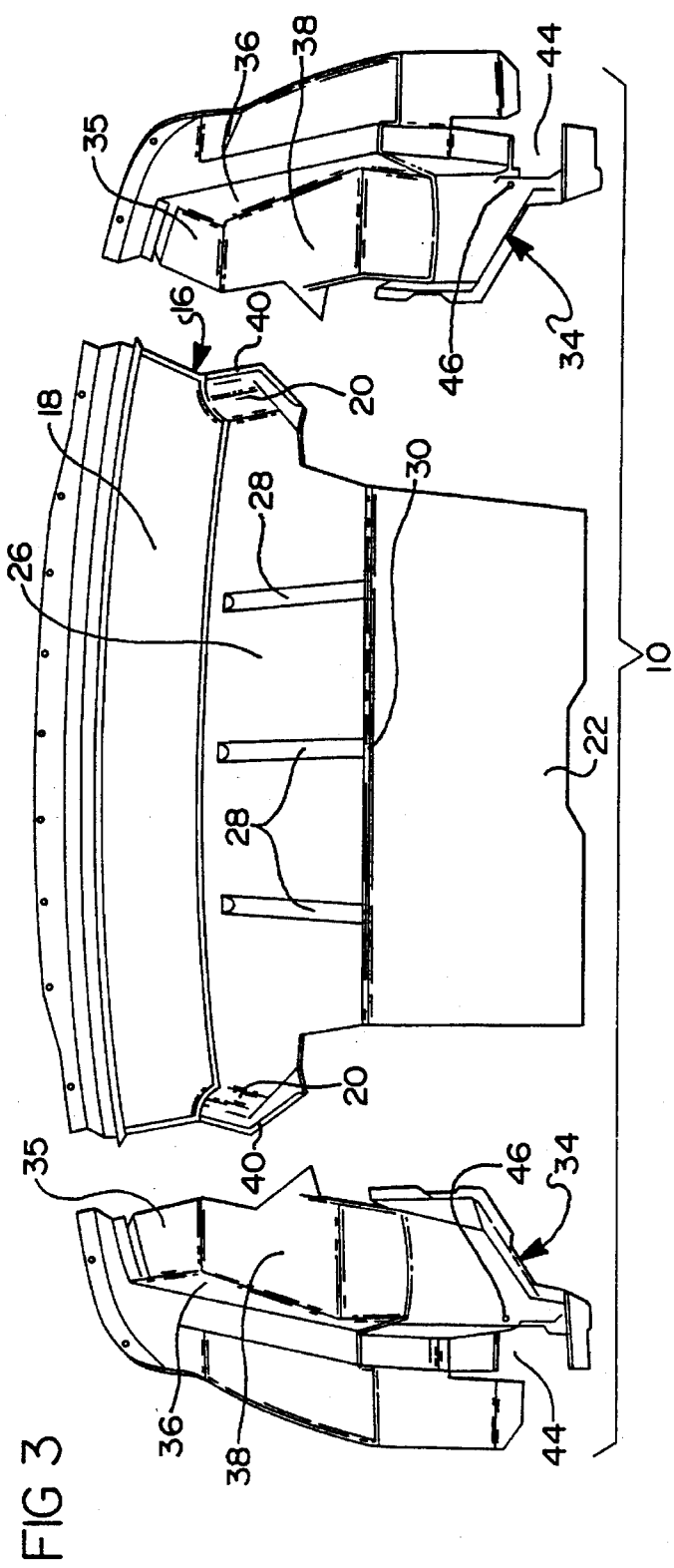
FIG. 3 is a exploded perspective view of the topwell assembly of FIG. 2.

As illustrated in FIGS. 2 and 3, the topwell assembly 10 includes a molded unitary shell, generally indicated at 16, having rear and side wall portions 18 and 20, respectively. The shell 16 also has a front wall portion 22 which is adjacent the rear seat 15 of the vehicle 12. The shell 16 has a floor or support surface 26 which provides a surface for storing both the top 14 when the top 14 is in the down position and provides a storage space for luggage or other materials when the top 14 is in an up or cover position. The support surface 26 includes at least one, preferably a plurality of, longitudinally extending and laterally spaced channels 28 and a laterally extending channel 30 at one end of the channels 28. The channels 28 provide structural support to further increase the rigidity and strength of the support surface 26. Additionally, the channels 28 provide drainage of water forward towards the channel 30. The channel 30 has at least one, preferably a plurality of, drain aperture assemblies, generally indicated at 32, from which the water exits the vehicle 12.

The shell 16 is molded from a plastic material such as polyethylene. As a unitary member, the shell 16 may be made in a shape which conforms to an environment of continuous and non-continuous surfaces. As a formed part, the shell 16 allows for maximum use of storage space while minimizing any gaps and voids in adjacent parts.

The topwell assembly 10 also includes forward portions, generally indicated at 34, at each side of the shell 16. Each forward portion 34 includes rear and side wall portions 35 and 36, respectively. The forward portion 34 includes a shelf portion 38 which overlaps a flange 40 on the side wall portions 20 without the possibility of a gap or a void occurring between the two parts which would increase the chance for water leakage in an undesirable area or a reduction in sound insulation. It should be appreciated that the rear wall portions 35 and 18 overlap each other and the flange 40 prevents water from entering between them.

The forward portions 34 include a cut out area 44 to receive the apparatus for raising and lowering the convertible top 14. The forward portions 34 also include drainage apertures 46 for draining and removing any fluid such as water which accumulates and leaks through the top 14. The forward portions 34 are molded as a unitary member from a plastic material, preferably, polyethylene.

Figure 4:
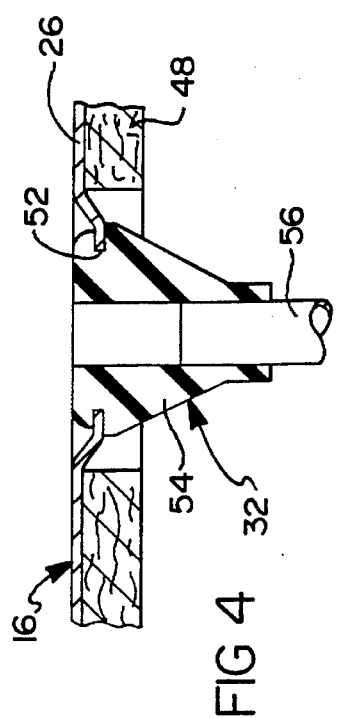
FIG. 4 is a sectional taken along line 4—4 of FIG. 2.

The topwell assembly 10 further includes an insulating material 48 placed on the back or outward surface 50 of the shell 16. The purpose of the insulating material 48 is to reduce vehicle noise through noise dampening and absorption. Preferably, the insulating material 48 includes a pad of fibrous or foam material adhered to the outer surface of the shell 16. Referring to FIG. 4, the drain aperture assembly 32 includes an aperture 52 in the shell 16 and an elastomeric or other resilient material grommet 54 which is inserted into the aperture 52. The drain aperture assembly 32 also includes a drain tube 56, preferably a rubber or elastomeric material tube, inserted into the grommet 54 to allow any water draining into the topwell assembly 10 through or from the top 14 to be drained to the outside of the vehicle 12. It should be appreciated that the drain aperture assembly 32 may be provided for the drainage apertures 46 in the forward portions 34.

Accordingly, the topwell assembly 10 reduces the cost and assembly time while increasing topwell life and durability. Additionally, the overall weight of the topwell assembly 10 is reduced because it utilizes a sealed, unitary, continuous shell 16 and silencer system which eliminates the need for separate components to catch the water and silence any vehicle noise. The topwell assembly 10 improves water drainage, silencing or noise dampening, part durability and aesthetics of a vehicle while reducing the number of parts and the weight of the system.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A topwell assembly comprising:

a rigid, unitary molded plastic shell for attachment to vehicle structure to support a convertible top having an integral support surface, side wall surfaces projecting laterally from said support surface, a front wall surface depending downwardly from said support surface and having a terminal end adjacent a floor of vehicle structure, and a rear wall surface projecting from said support surface;

said support surface having three longitudinally extending and laterally spaced channels formed therein to provide a dual function to increase rigidity and strength of said support surface and to drain fluid from said support surface, and a laterally extending channel between one end of said longitudinally extending channels and said front wall surface, and at least one aperture in said laterally extending channel for draining water collected in said longitudinally extending channels and said laterally extending channel;

separate side portions at each side of said shell between vehicle structure and said side wall surfaces and having a shelf portion overlapping a flange on said side wall surfaces of said shell such that said side portions may sealingly engage said shell;

a grommet member sealingly disposed within said aperture;

a drainage tube having an end thereof attached to said grommet; and a silencing material attached to an outer surface of said shell.

* * * * *